United States Patent [19]
Bertram et al.

[11] Patent Number: 5,899,325
[45] Date of Patent: May 4, 1999

[54] FOAM IN BAG PACKAGING SYSTEM AND METHOD FOR PRODUCING THE SAME

[75] Inventors: George Teofilius Bertram; William Richardson Armstrong, both of Newtown; Lawrence John Pillote; William Joseph Mahon, both of Southbury; Robert Don Wheeler, Fairfield, all of Conn.; Laurence Burst Sperry, Boston, Mass.

[73] Assignee: Sealed Air Corporation, Saddle Brook, N.J.

[21] Appl. No.: 09/042,444

[22] Filed: Mar. 13, 1998

[51] Int. Cl.$^6$ .............................. B65D 81/32; B65B 9/02
[52] U.S. Cl. ........................... 206/219; 53/450; 206/524
[58] Field of Search ............ 53/450, 461; 206/219–222, 206/568, 523, 524

[56] References Cited

U.S. PATENT DOCUMENTS

| | | |
|---|---|---|
| 3,222,843 | 12/1965 | Schneider . |
| 3,332,670 | 7/1967 | Swartz . |
| 3,419,134 | 12/1968 | Fitts . |
| 3,674,134 | 7/1972 | Turner . |
| 3,722,833 | 3/1973 | Inoue et al. . |
| 4,057,047 | 11/1977 | Gossett . |
| 4,145,449 | 3/1979 | Nelham . |
| 4,226,330 | 10/1980 | Butler . |
| 4,232,788 | 11/1980 | Roth . |
| 4,735,675 | 4/1988 | Metz . |

FOREIGN PATENT DOCUMENTS

| | | |
|---|---|---|
| 894727 | 2/1983 | Belgium . |
| 9000813 | 3/1990 | Germany . |
| 2134067 | 8/1984 | United Kingdom . |

*Primary Examiner*—Jim Foster
*Attorney, Agent, or Firm*—Alston & Bird LLP

[57] ABSTRACT

A foam-in-bag packaging system and method of forming the same is provided in which a bag of flexible plastic film material includes superposed panels joined around their peripheral edges to define an enclosed space which is vented to the outside of the bag by venting perforations in the panels, a packet or pouch of barrier material capable of maintaining foam precursor components in a stable, unreacted state for an extended time period is positioned in the enclosed space in the bag adjacent one end thereof and secured from movement therefrom, the packet has first and second compartments therein separated by a first frangible seal extending across the packet and first and second foam precursor components contained respectively in the first and second compartments, the packet has a second frangible seal between one of the compartments and the enclosed space in the bag, the bag being folded along spaced transverse fold lines into a relatively compact form and being folded along a fold line coincident with the first frangible seal to form a mechanical barrier between the first and second compartments of the packet, and a detachable label holding the bag in its folded, compact form.

52 Claims, 8 Drawing Sheets

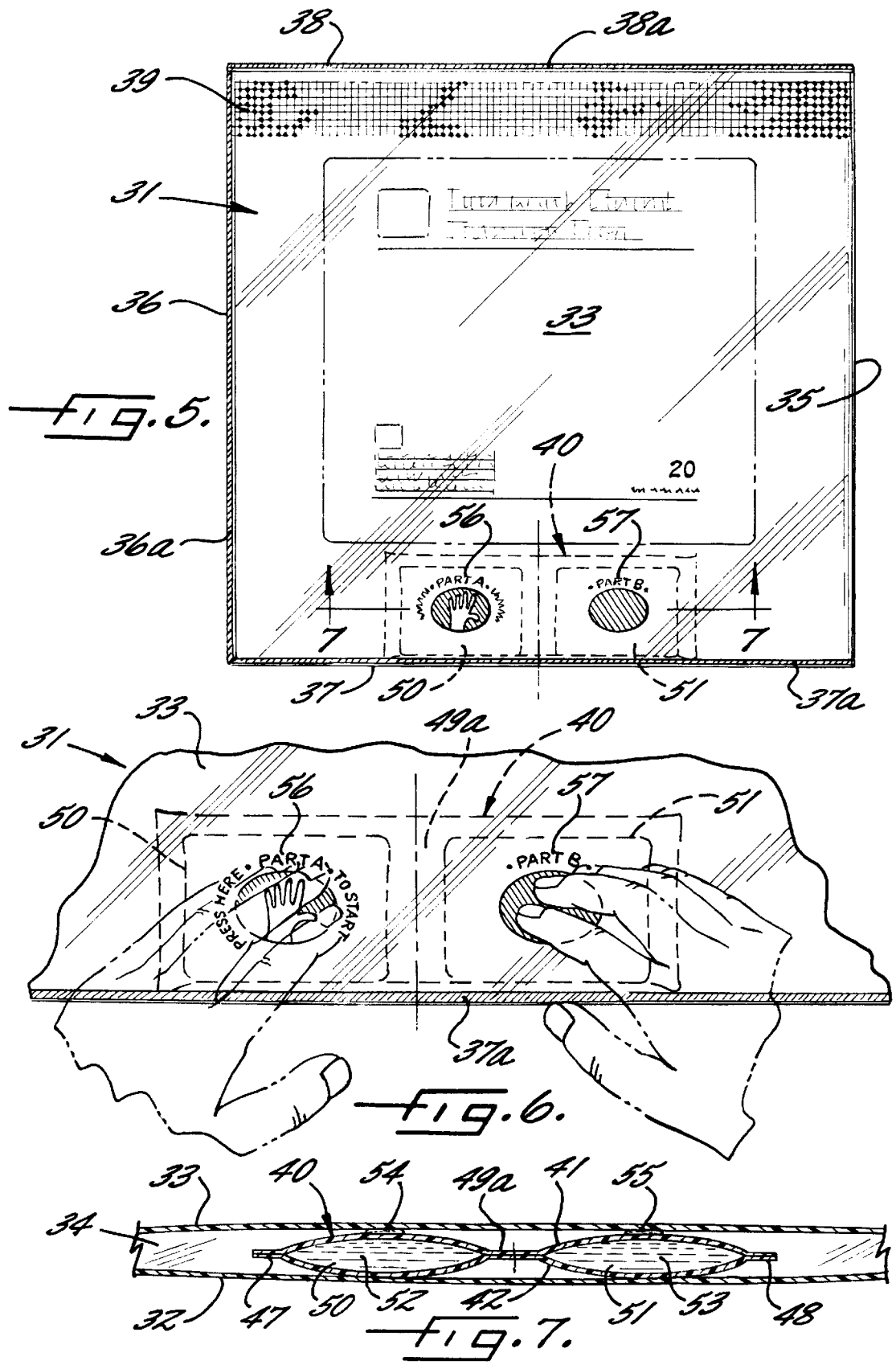

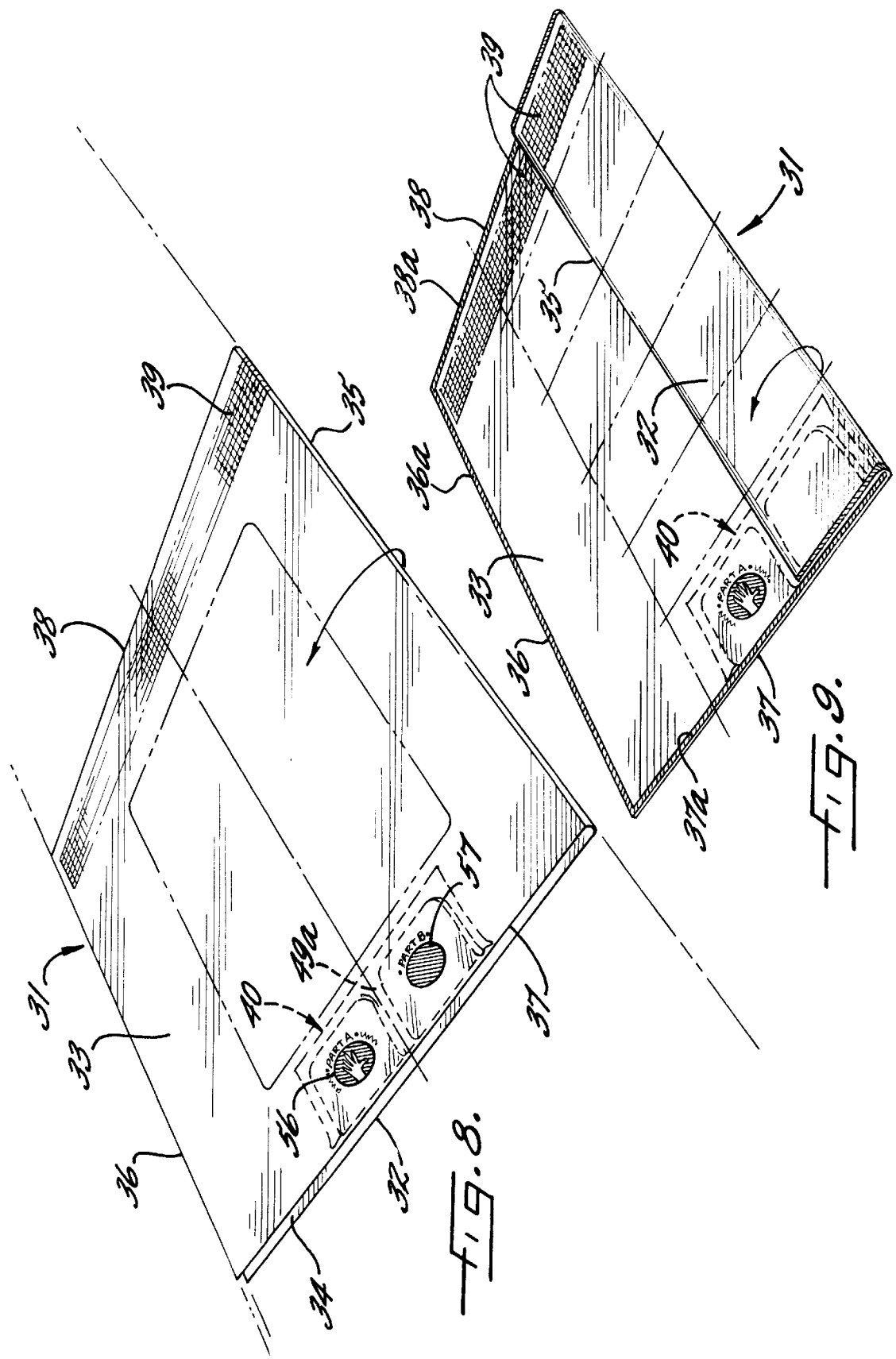

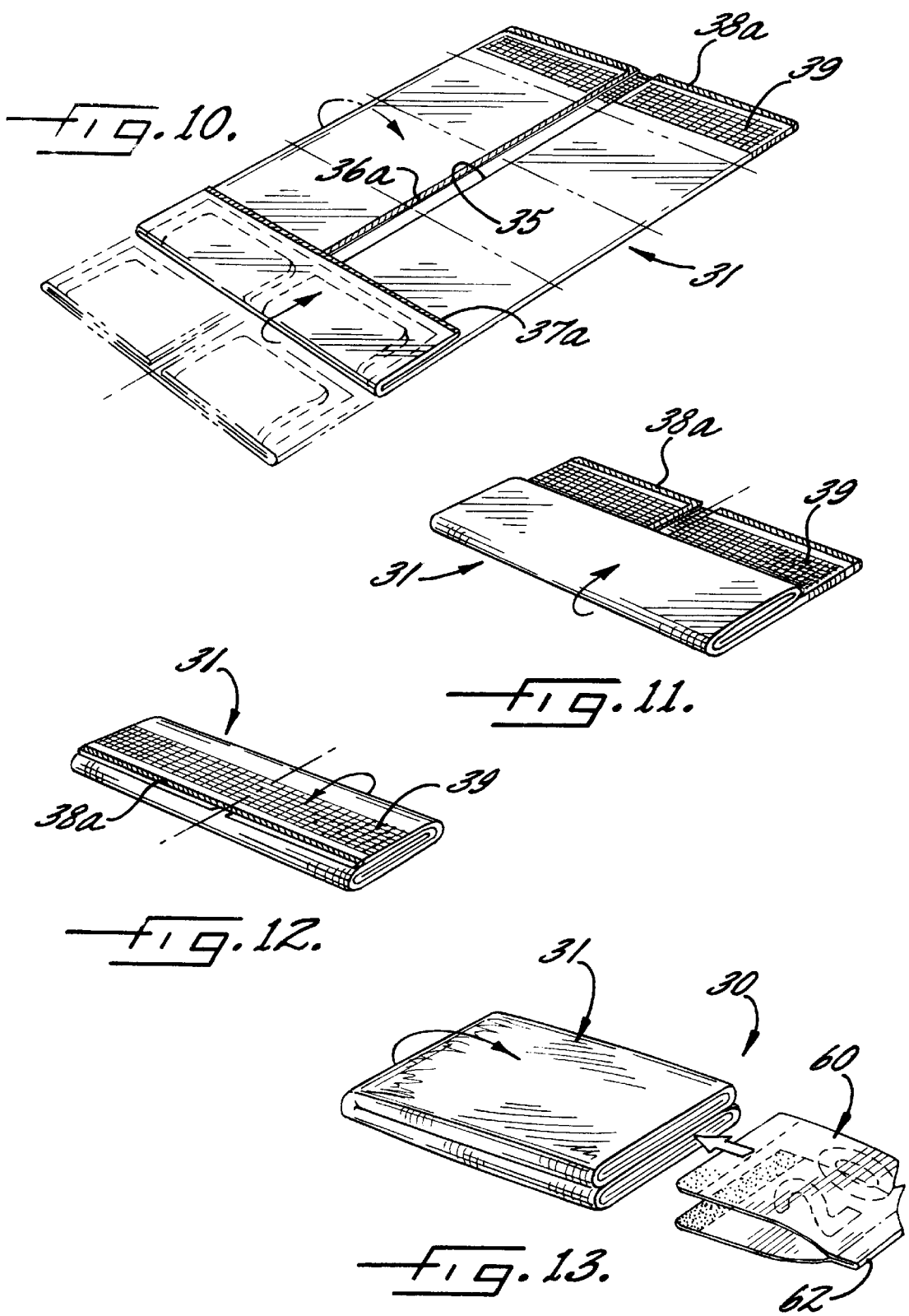

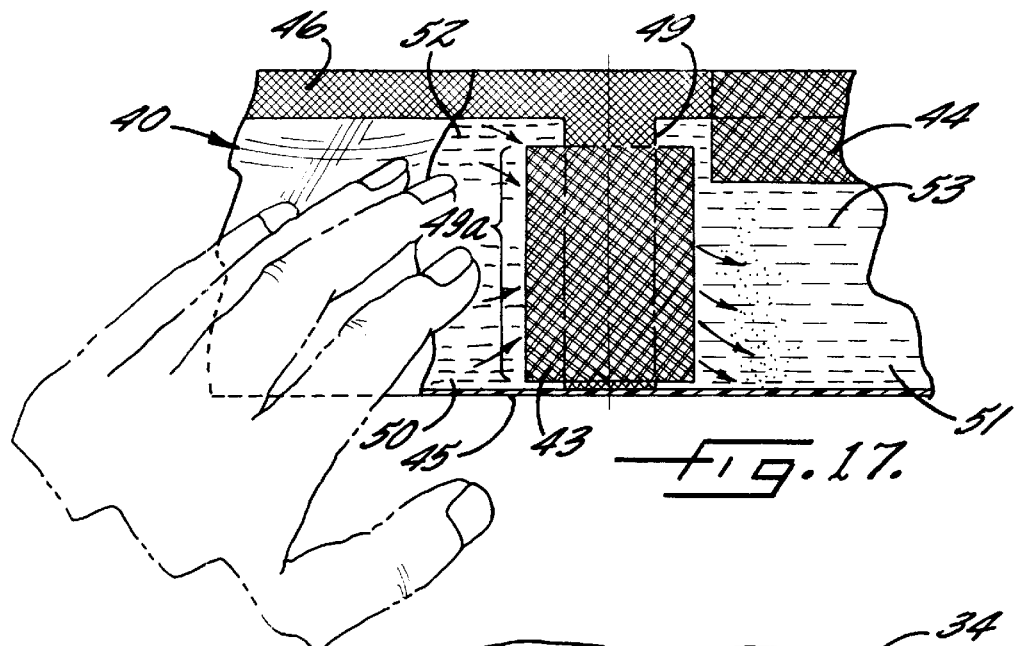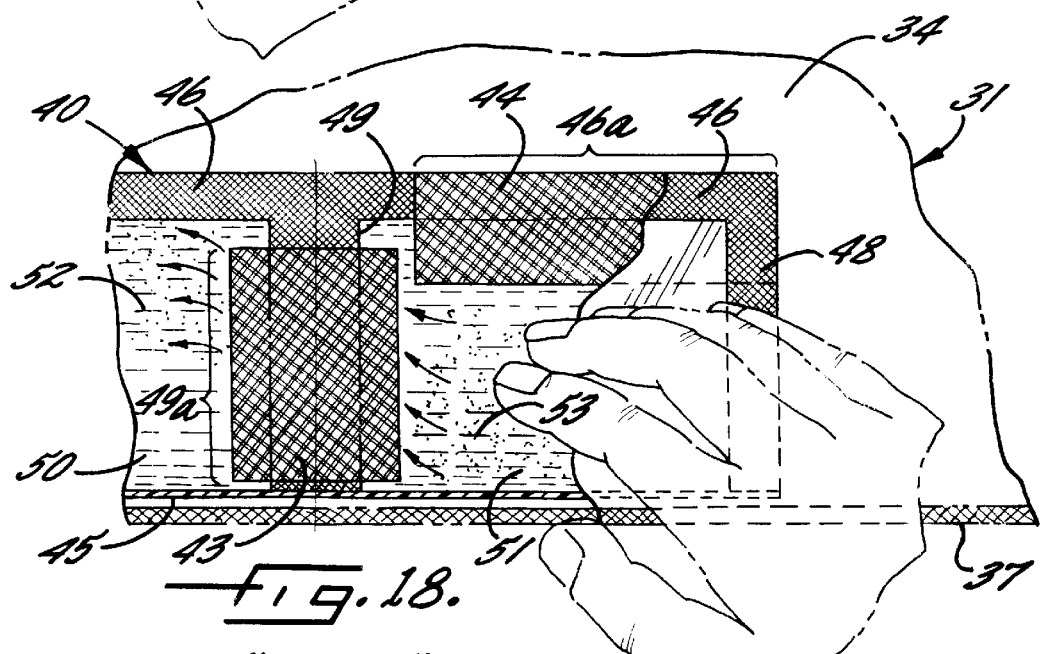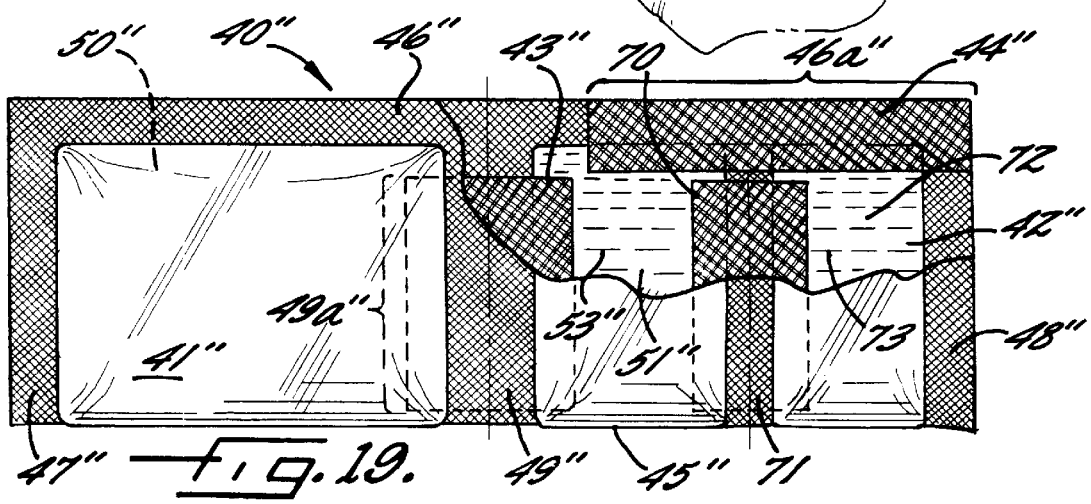

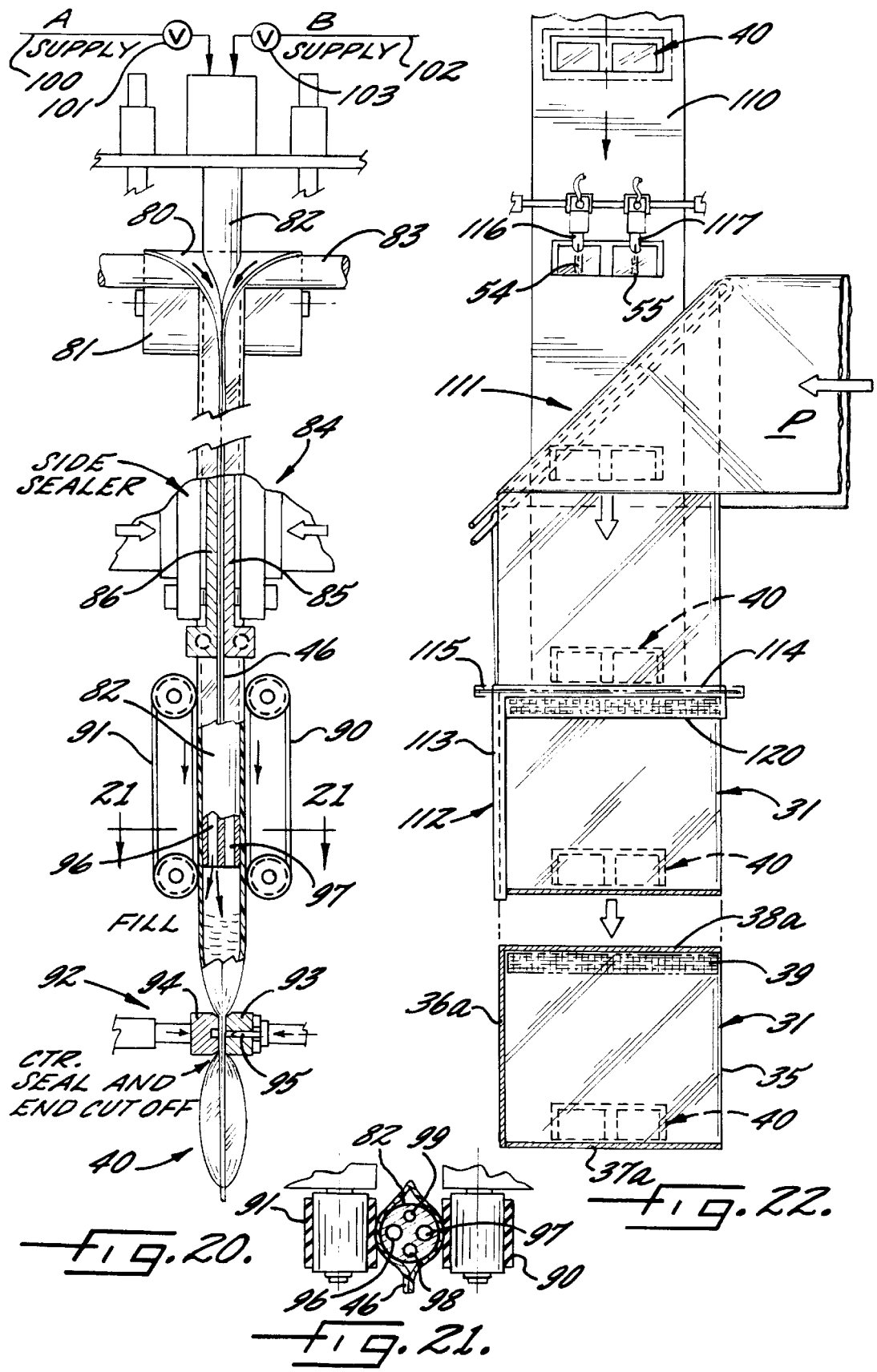

FOAM IN BAG PACKAGING SYSTEM AND METHOD FOR PRODUCING THE SAME

FIELD OF THE INVENTION

The present invention relates to foam-in-place packaging of articles susceptible to damage during handling, shipment and storage and in particular, relates to foam-in-bag packaging systems which will produce foam cushions upon demand and method of producing the same.

BACKGROUND OF THE INVENTION

The packaging of fragile articles or articles susceptible to damage during such packaging, shipment and storage presents many distinct problems. Foam-in-place packaging has been well known and widely used as protective packaging for such articles for a number of years. Foam-in-place technology is based upon the reaction between two (usually liquid) precursor components, which when mixed will react to form a polymer foam and gaseous by-products. In particular, and most commonly, an isocyanate containing component is mixed with a polyol containing component and these components react to produce a urethane polymer (polyurethane), steam and carbon dioxide. Under proper conditions, the steam and carbon dioxide generated by the reaction will disburse through the polymer and form an expanded polyurethane foam that provides protective cushioning for articles being packaged. The reaction of the components, when mixed to form an expanded foam, takes a minute or two and this time frame makes it feasible to manipulate and use the foam for packaging purposes.

Initially, the foam precursor components were injected into containers (e.g. corrugated boxes), and either a mold element was used to form an article receiving cavity as the foam expanded or the article wrapped in a protective material was itself placed in the container and the foam permitted to expand therearound. Such foam-in-place packaging has been very successful and is still widely used for certain packaging purposes.

However, such foam-in-place packaging did not address or was not suited for many packaging purposes. Accordingly, a next generation of foam-in-place packaging has been developed in which devices were provided which concurrently form plastic bags and inject into the bag the mixture of foam precursor components. The bag is provided with vents to the outside to permit the steam and carbon dioxide by-products to escape during the formation of the foam. Prior to the reaction of the components to produce foam, an operator places the newly made bag into a container in which an object has been placed and then closes the container. The precursors react to produce foam which fills the void areas within the container while forming a custom shaped cushion around the object being packaged. Such foam-in-bag packaging technology has also been quite successful and is now in substantial use.

Examples of such foam-in-bag technology heretofore developed is shown and described in a number of patents commonly assigned with this application and including U.S. Pat. Nos. 4,800,708; 4,854,109; 4,938,007; 5,027,583; 5,139,151 and 5,376,219.

All of these devices are characterized by forming the bags and injecting the foam precursor components into the bags immediately prior to the reaction of the components and the production of foam in the bags. Therefore, these devices by necessity must be placed adjacent the packaging operation. Here again, these devices are not adaptable or usable in all packaging situations, although they have greatly expanded the use of foam-in-place packaging technology.

U.S. Pat. No. 5,699,902, also commonly assigned to the assignee of this application, discloses a still further generation of foam-in-place packaging. This patent discloses a packaging system in which a bag is formed of flexible plastic film material defining an enclosed space therein and having separate interior cells in the enclosed space. The cells contain two different foam precursor components. The two cells containing the foam precursor components are separated by a frangible seal which maintains the precursor components separate until it is desired to use the bag. Once the packaging system is to be used, the frangible seal between the two cells is broken and the two precursor components are mixed.

There is also provided another frangible seal between the cells and the enclosed space within the bag. This second frangible seal is broken by the reaction of the two precursor components and the production of foam which expands out of the cells into the enclosed space in the bag until the interior of the bag is substantially filled and a foam cushion is formed. The interior of the bag is vented to the outside so that the gaseous by-products of the foaming reaction may escape from the bag. By this arrangement, a foam-in-bag packaging system has been provided in which bags could be produced at locations remote from the packaging operations, packaged in containers, shipped to the packaging operation locations and stored until desired for use. When desired for use, an appropriately sized bag is removed from its container, the first frangible seal between the two cells is broken and the chemicals mixed, and the second frangible seal is broken by the reaction and a foam cushion is formed in the enclosed space in the bag. Accordingly, a packaging system of greatly increased versatility and usability was thus provided.

However, even this further generation of foam-in-place packaging had certain disadvantages and problems associated therewith. For example, as shown in U.S. Pat. No. 5,699,902, the bags containing the interior cells are very flexible and somewhat difficult and awkward to package and handle. Additionally, the interior cells are formed by the plastic film material of the bag with appropriate additional layers providing the barrier characteristics required for the cells, and by heat seals (including the frangible seals) which divide the cells from each other and from the interior of the bag. Accordingly, the cells extend from opposite sides of the bag throughout the width of the bag and the manner of forming the cells is costly. Obviously, for different size bags, different quantities of the foam precursor components are required. However, the cells in the U.S. Pat. No. 5,699,902 patent remain of a constant size and, when a lesser quantity of components are used than the volume within the cells, the remainder of the cell contains air.

SUMMARY OF THE INVENTION

With the foregoing in mind, it is an object of the present invention to provide a foam-in-bag packaging system in which the foregoing disadvantages and deficiencies of prior foam-in-bag packaging systems are obviated and overcome.

It is a further object of this invention to provide a method of producing a foam-in-bag packaging system which overcomes these disadvantages and deficiencies.

The foregoing objects of this invention are accomplished by a foam-in-bag packaging system in which a bag is formed of flexible plastic film material which defines an enclosed interior space, which interior space is vented to the outside of the bag to permit gaseous by-products of the foaming reaction to escape. A packet or pouch having a plurality of compartments therein separated from each other by at least one frangible seal and having another frangible seal between the compartments in the packet and the enclosed space within the bag is separately and independently formed. First and second foam precursor components are contained in the separate compartments within the packet and are maintained separated by the interior frangible seal. The packet is formed of a barrier material which is capable of maintaining the foam precursors in a substantially stable and unreacted state for the desired shelf life of the foam-in-bag packaging system.

The separately formed packet is placed within the enclosed space in the bag and preferably adjacent one end of the bag. Also, the packet is secured to the plastic film material of the bag such that the packet is restrained from moving around within the enclosed space in the bag. The packet can be made such that the compartments within the packet are only of a size necessary for the amount of precursor components required to produce a foam cushion substantially filling the enclosed space within a particular sized bag. In one embodiment of the invention, the packet will vary in size with the size of bag in which it is incorporated. Since the volume of liquid precursor components needed to produce a foam cushion of this size is only a small fraction of the volume of the cushion which will be formed thereby, a considerable savings of material is realized. Also, a more compact and more easily handled packaging system is provided. The compactness of the foam-in-bag packaging system of the present invention requires smaller cartons for packaging thereof and occupies considerably less space during shipment and storage resulting in considerable cost savings.

Once the bag is formed and the packet is incorporated and secured therein, the bag is folded along spaced apart transverse fold lines, preferably spaced apart a distance corresponding generally to the width of the packet, such that the resultant folded bag has its lengthwise dimension substantially reduced. The folded bag is again folded substantially along the interior frangible seal in the packet to bring opposing portions of the folded bag into juxtaposition to reduce further the size of the bag. This fold provides a mechanical barrier along the interior frangible seal which will assist the frangible seal in maintaining the foam precursor components separated. A removable label is applied across the free ends of the folded bag to removably secure the free ends of the bag together and to maintain the folded bag in its compact, folded form. Preferably, the label is detachable by having tear lines along which the label may be torn and a portion of the label removed. The removable portion of the label provides a convenient place for printing use instructions, safety information and other requisite or desirable information and which may be removed and discarded once the bag is to be used. The label serves not only to secure the bag in its compact folded form, but also serves as a grasping means for ease in removing the folded bags from a carton and/or a warming oven in which the bag can be readily heated to provide the energy necessary to facilitate the reaction of the precursor components once they are mixed together.

The present invention includes a method of forming the packaging system which includes forming the bag from flexible plastic film material, inserting the preformed packet into this bag while securing the packet and then joining the edges thereof. Vent openings are formed in the bag to permit the gases to escape. Thereafter, the method includes folding the bag into a compact form and releasably securing the bag in that form, preferably by an adhesive label.

BRIEF DESCRIPTION OF THE DRAWINGS

Some of the objects and advantages of the present invention having been stated, others will appear as the description proceeds when considered in conjunction with the accompanying schematic drawings in which:

FIG. 5 is a plan view of a foam-in-bag packaging system as illustrated in FIG. 1;

FIG. 6 is a fragmentary, plan view of the bag shown in FIG. 5 illustrating the manner of mixing of the foam precursor components within the bag;

FIG. 7 is an enlarged, fragmentary, sectional view taken substantially along line 7—7 in FIG. 5;

FIG. 8 is a perspective view of the bag illustrated in FIG. 5 showing the method of forming such bag;

FIG. 9 is a perspective view of the bag illustrated in FIG. 5 and illustrating the manner of folding thereof;

FIGS. 10 through 13 are perspective views similar to FIG. 9 illustrating successive steps in the folding of the bag illustrated in FIG. 5;

FIG. 17 is a fragmentary, plan view of the packet shown in FIG. 16 illustrating the manner in which the frangible seal is broken and the foam precursor components are mixed;

FIG. 18 is a view similar to FIG. 17 further illustrating the manner of mixing of the foam precursor components;

FIG. 19 is a view similar to FIG. 16 illustrating a different embodiment of a packet in accordance with the present invention;

FIG. 20 is a fragmentary, schematic, elevational view, partially in section, of an apparatus and method of forming the packets and filling the same with the foam precursor components;

FIG. 21 is a fragmentary sectional view taken substantially along line 21—21 in FIG. 20;

FIG. 22 is a fragmentary, schematic, plan view of an apparatus and method of forming the bags and inserting previously formed packets therein;

DETAILED DESCRIPTION OF THE PREFERRED EMBODIMENTS

Figure 1:
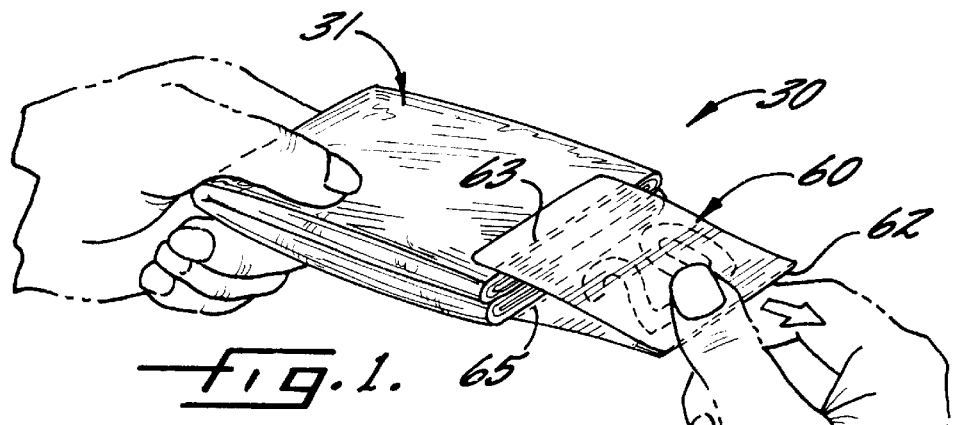
FIG. 1 is a somewhat schematic, perspective view illustrating the foam-in-bag packaging system of the present invention and illustrating the handling thereof preparatory to use.
Figure 2:
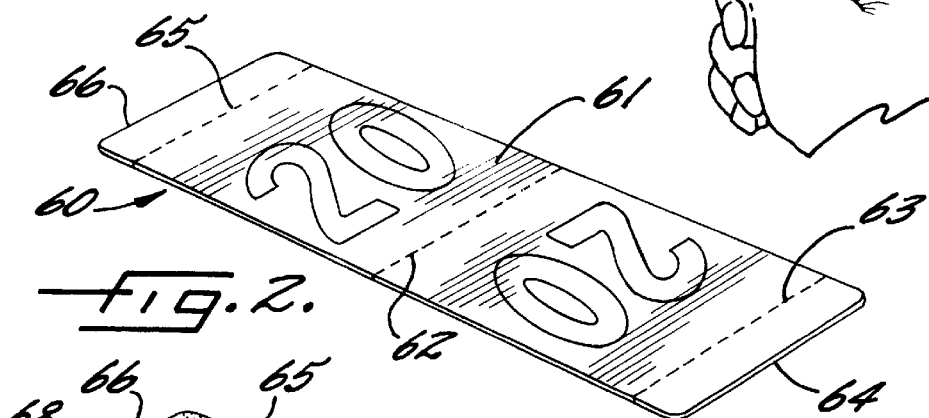
FIG. 2 is a perspective view of one side of the label forming a part of the foam-in-bag packaging system illustrated in FIG. 1.
Figure 3:
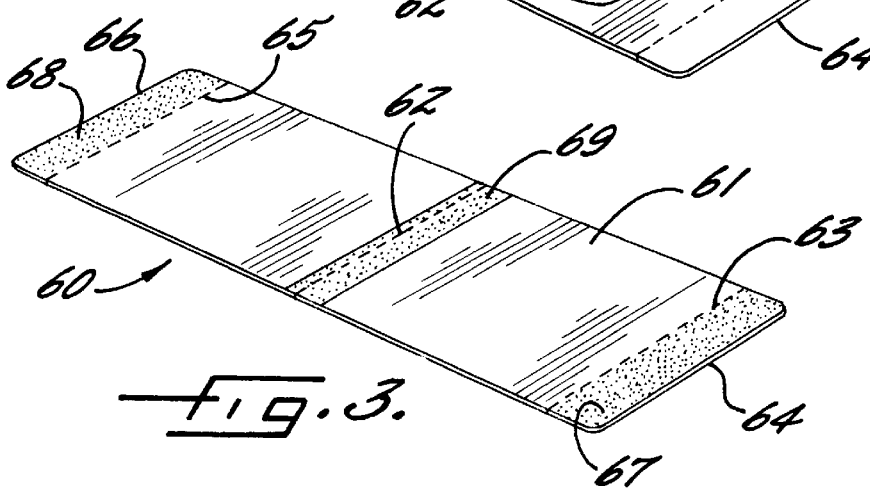
FIG. 3 is a perspective view of the obverse side of the label illustrated in FIG. 2.

Referring now more specifically to the drawings and particularly to FIG. 1, there is illustrated therein a foam-in-bag packaging system, generally indicated at 30, incorporating the features of the present invention. The packaging system 30 includes a folded bag generally indicated at 31 and a detachable label, generally indicated at 60. The bag 31 is illustrated more specifically in FIGS. 5 through 9 and includes a pair of superposed panels 32 and 33. Panels 32 and 33 are formed of flexible plastic film material, such as that described in U.S. Pat. No. 5,699,902 issued Dec. 23, 1997, which is incorporated fully herein by reference. Panels 32 and 33 are preferably elongate and have sides 35, 36 and ends 37, 38 joined together to define an enclosed space 34 therewithin. It is to be understood that panels 32 and 33 may be formed from separate sheets of plastic film material or, as illustrated in FIG. 8, from a single sheet or web of plastic film material folded along its longitudinal center-line to form the joined side edge 35. The other side edge 36 and the end edges 37 and 38 are joined together by heat seals 36a, 37a and 38a to enclose completely the space 34 between the panels 32 and 33. The enclosed space 34 is vented to the outside of the bag 31 by a band 39 of perforations through the panels 32 and 33.

A packet or pouch 40 is positioned within the space 34 between the panels 32 and 33 prior to joinder of the side and end edges 35, 36 and 37, 38. Preferably, packet 40 is positioned adjacent one end of the bag 31, but it is to be understood that the packet 40 may be located at any desired location within the enclosed space 34. Most preferably, packet 40 is positioned at the opposite end of bag 31 from the band 39 of venting perforations.

Packet 40 includes a pair of panels 41 and 42 of a barrier material capable of maintaining foam precursor components in a stable, unreacted state for as long as required between manufacture thereof and use of the foam-in-bag packaging system 30. This barrier material preferably is a composite material which includes a heat sealable layer on the inside of the barrier material when the barrier material is formed into the packet 40 and other layers of material necessary to provide the requisite moisture imperviousness and other barrier characteristics. Such a composite material is described in U.S. Pat. No. 5,699,902 which has been incorporated herein by reference.

Figure 14:
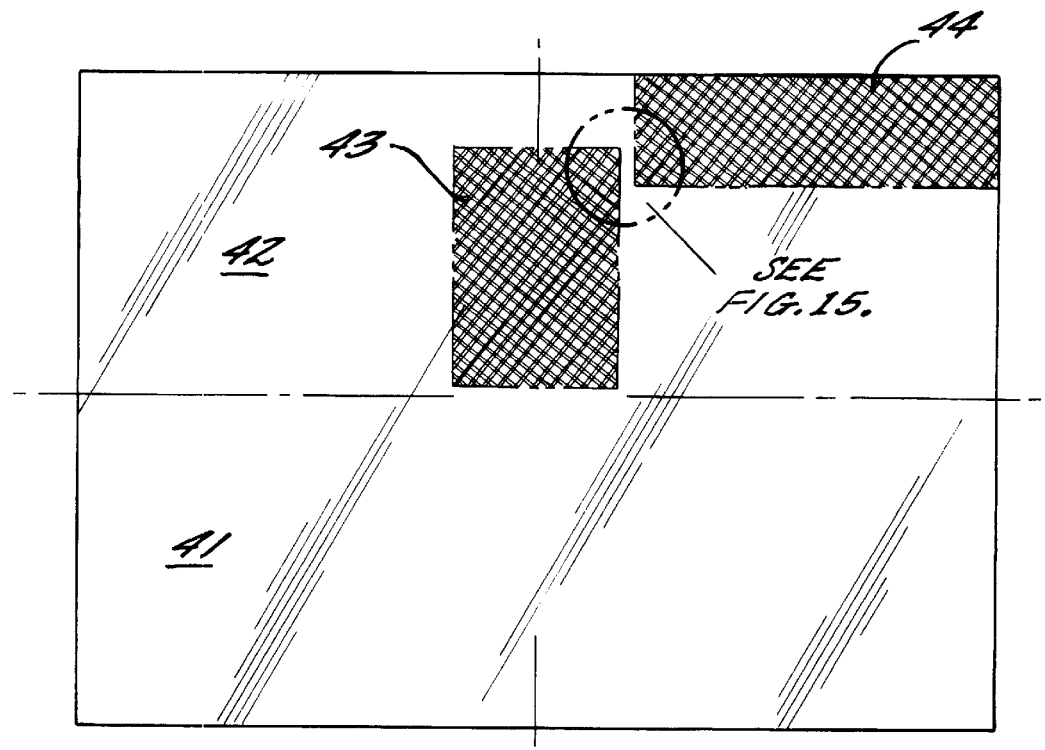
FIG. 14 is a plan view of the barrier material from which the packet contained in the lower end of the bag illustrated in FIG. 5 is formed.
Figure 15:
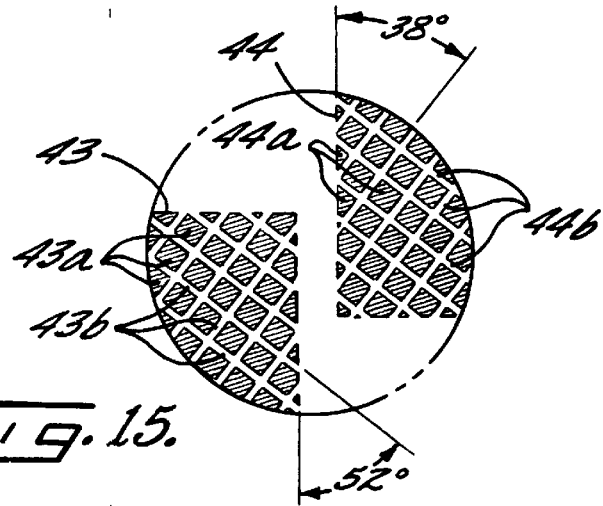
FIG. 15 is an enlarged, fragmentary detail of the area contained within the circle in FIG. 14.
Figure 16:
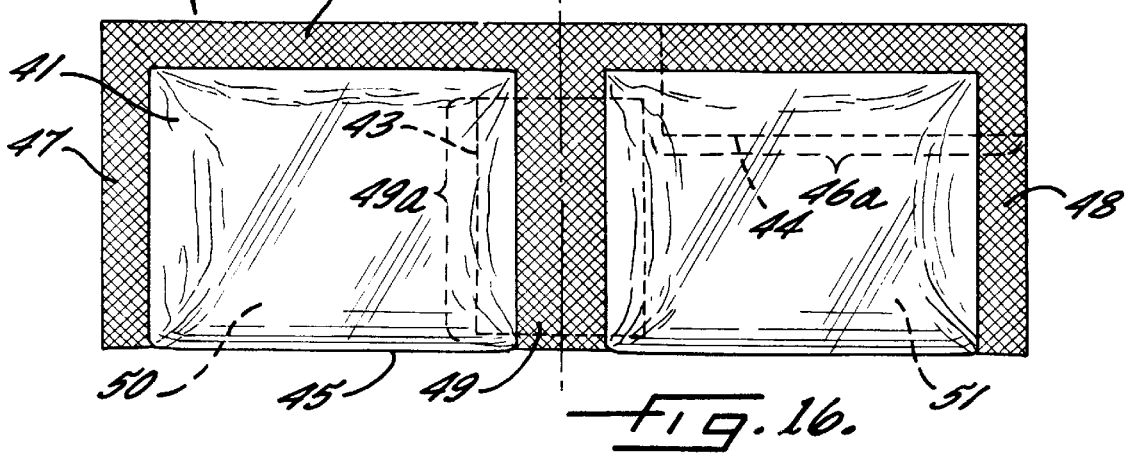
FIG. 16 is a plan view illustrating the packet formed from the barrier materials shown in FIG. 14 and containing the foam precursors therein.

The panels 41 and 42 may be formed from separate sheets of barrier material or may be formed by a single sheet of barrier material that is folded longitudinally along the center-line thereof, as is illustrated in FIGS. 14 and 16. Prior to formation of the panels 41 and 42 into the packet 40, certain areas of panel 42 are printed with a masking material or ink to prevent areas covered thereby from being heat sealed to panel 41. In this embodiment, a first printed area 43 extends transversely of the width of panel 42, from the longitudinal fold line toward the other side edge thereof, a predetermined distance less than the full width of panel 42. A second printed area 44 extends longitudinally of panel 42 from the right end (FIG. 14) toward the left end a predetermined distance less than the distance to printed area 43. The printed areas 43 and 44 comprise discontinuous printed patterns with spaced apart printed areas 43a and 44a leaving unprinted areas 43b and 44b therebetween. Since printed areas 43a and 44a serve as masking for the underlying heat sealable layer and prevent the panels 41 and 42 from being heat sealed together wherever a printed area 43a or 44a occurs, only unprinted areas 43b and 44b may be heat sealed together to panel 41 thereby forming frangible seals.

The panels 41 and 42 are folded along the longitudinal center-line of the sheet of barrier material to position panels 41 and 42 in juxtaposed relation. The side and end edges of panels 41 and 42 are joined to provide an enclosed space between panels 41 and 42. One side edge is joined by the fold 45. The opposite side edges of panels 41 and 42 are heat sealed together by a heat seal 46 and the ends are similarly heat sealed together by heat seals 47 and 48. A heat seal 49 extends transversely across the panels 41 and 42 intermediate the printed area 43 such that heat seal 49 includes a frangible seal 49a within the printed area 43. Seal 49 divides the enclosed space between panels 41 and 42 into first and second compartments 50 and 51. Compartment 50 is filled with a first foam precursor component 52 and compartment 51 is filled with a second foam precursor component 53. Preferably, the first foam precursor component 52 is an isocyanate containing component and the second foam precursor component 53 is a polyol containing component.

The heat seal 46 extends along the length of printed area 44 and, in that area, provides a second frangible seal 46a between the second compartment 51 and the enclosed space 34 in bag 31. To ensure that the frangible seals 49a and 46a are sufficiently frangible that the same can be broken as needed and break evenly and smoothly, it has been discovered that the grid pattern of unprinted areas 43b and 44b should not have the intersecting points thereof aligned parallel to the heat seals 49 and 46, but disposed at an acute angle thereto. It is preferred that the acute angle at which the intersecting points of the unprinted grid pattern are disposed relative to the heat seals 49 and 46 be within the range of about 5° to 9° and more preferably such acute angle should be about 7°.

The packet 40 is preferably secured to one of the panels 32 and 33 of bag 31 by securing means to prevent the packet from moving within the enclosed space 34. Preferably this securing means constitutes two bands or beads 54, 55 of hot melt adhesive which are applied to the outside of panel 41 and adhere the packet 40 to the inside of panel 33 (FIG. 7). Most preferably, the hot melt adhesive is of the pressure sensitive type.

While the packet 40 may be positioned at any desired location within the enclosed space 34 of bag 31, it is preferred that the center-line of the frangible seal 49a be positioned substantially coincident with the longitudinal center-line of the bag 31, as is illustrated in FIGS. 5 and 6. Preferably, the outside of panel 33 of bag 31 has a first printed indicia 56 thereon at a location overlying substantially the central portion of compartment 50 of packet 40 containing the first foam precursor component 52 (Part A) (FIGS. 5 and 6). A second printed indicia 57 is similarly located on the exterior surface of panel 33 on the opposite side of the frangible seal 49a and located substantially over the central portion of compartment 51 containing the second foam precursor component 53 (Part B).

When it is desired to produce foam in the bag 31, such foam may be produced by breaking the frangible seal 49a and mixing the first and second foam precursor components 52 and 53 together. This is readily accomplished by placing the bag 31 upon a firm surface and pressing downwardly upon the printed indicia 36 to apply pressure to the liquid foam precursor component 52 in compartment 50 of packet 40 (FIG. 17). The increased pressure of the liquid against the frangible seal 49a will be sufficient to break that seal and to force the first foam precursor component 52 through the previously sealed area into the second compartment 51 to mix partially with the second precursor component 53. At that point, the user should release pressure upon first printed area 56 above the first compartment 50 and apply downward pressure to the second printed area 57 above the second compartment 51 (FIG. 18). The partially mixed first and second foam precursor components 52, 53 are thusly forced through the broken frangible seal 49a into first compartment 50 to mix further the first and second foam precursor components 52 and 53. These alternating pressures should be continued until the first and second foam precursor components 52 and 53 are thoroughly mixed.

Figure 4:
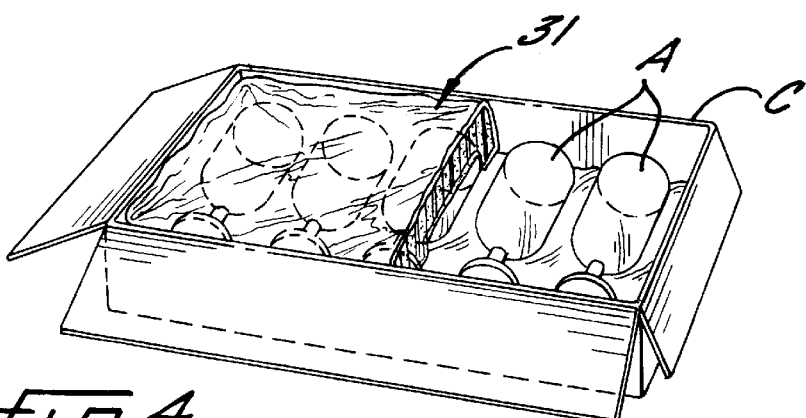
FIG. 4 is a perspective view, partially in section, illustrating use of the foam-in-bag cushion resulting from the foam-in-bag packaging system of the present invention.

After a minute or two from mixing of the first and second foam precursor components 52 and 53, the reaction between these components will commence and foam will commence to be formed. Such foam will expand and create pressure on the frangible seal 46a sufficient to break the frangible seal 46a. The foam will then expand out of the packet 40 into the enclosed space 34 within the bag 31. The reaction will continue until the foam precursor components 52 and 53 thoroughly react and the enclosed space 34 is substantially filled with foam, thereby producing a foam cushion. The carbon dioxide and some of the steam generated by the reaction will escape or be vented to the outside of the bag 31 through the perforations of band 39. The remainder of the steam will condense inside the bag 31. Prior to this reaction commencing, the bag 31 is placed in a carton C on top of articles A disposed therein such that when the foam cushion is formed, the foam will mold around the articles A, fixing the same in place and providing a custom shaped cushion therearound (FIG. 4).

Preferably, to provide the energy required to start and facilitate the reaction of the foam precursor components 52 and 53 and to ensure more complete reaction thereof, the bag 31 and packet 40 are warmed or heated to between 120° and 145° Fahrenheit, preferably about 130° F., prior to mixing of the precursor components. The other parameters for proper formation of the foam cushion are discussed and set forth in U.S. Pat. No. 5,699,902 previously incorporated herein by reference.

Referring now to FIGS. 9 through 13, the folding of the bag 31 into compact form is illustrated and will now be described. The bag 31 has been completely formed and the packet 40 is disposed in proper position therein and secured in place by the adhesives bands or beads 54 and 55. In this embodiment of the invention, the packet 40 may be formed of a length and width corresponding only to the required volume of space needed in the first and second compartments 50 and 51 to contain the requisite amounts of first and second foam precursor components 52 and 53 to produce sufficient foam to fill substantially the space 34 in bag 31. Indeed, the packet 40 may be of a length substantially less than the width of bag 31 and of a width of only a small fraction of the length of bag 31. The size of bag 31 will vary depending upon the size of carton C in which the bag is intended to be used. As the size of bag 31 increases, the amount of foam precursors 52 and 53 required to produce sufficient foam to fill the increased volume of enclosed space 34 will increase and, therefore, the size of the packet 40 must also increase. Since the length of packet 40 is the dimension thereof most easily varied, the size of the packet 40 is preferably varied by increasing or decreasing the length thereof.

In accordance with the present invention, the bag 31 is preferably folded inwardly along spaced apart, longitudinally extending fold lines, which are preferably closely adjacent to opposite ends of the packet 40. The first of such folds is illustrated in FIG. 9 and the second of such folds is illustrated in FIG. 10. Once the width of bag 31 has been substantially reduced by inwardly folding the side portions of the bag 31 which extend outwardly from opposite ends of the packet 40, the bag 31 is further folded along spaced transverse fold lines, which are preferably spaced apart a distance substantially corresponding to the width of packet 40. The first such fold along a transverse fold line is illustrated also in FIG. 10, while the continued folding of bag 31 along such transverse fold lines is illustrated in FIGS. 11 and 12. Finally, the folded bag 31 is folded along a fold line which is substantially coincident with the frangible seal 49a between the first precursor compartment 50 and the second precursor compartment 51 to further reduce and make more compact the bag 31. This fold also creates a mechanical barrier to mixing of the first foam precursor component 52 with the second foam precursor component 53 and thereby reinforces the frangible seal 49a.

The foam-in-bag packaging system 30 is completed by affixing the label 60 to the juxtaposed free end portions of the folded bag 31 as is illustrated in FIGS. 1 and 13. Label 60 comprises an elongate paper sheet 61 having a fold line 62 extending transversely thereacross at approximately the centerline of the paper sheet 61. A first tear line 63 is provided in paper sheet 61 spaced from the end 64 of sheet 61 a predetermined distance. A second tear line 65 is formed in the opposite end portion of sheet 61 spaced a comparable distance inwardly from end 66 of sheet 61. The tear lines 63 and 65 are preferably formed by spaced apart perforations or holes formed in sheet 61. One side or surface of sheet 61 is preferably provided with printed indicia which may include directions for use, handling, etc. of the packaging system 30 as required by regulations or as desired.

The obverse side or surface of sheet 61 is provided with a first band of adhesive 67 extending from the tear line 63 to the end 64 of sheet 61. A second band of adhesive 68 is provided from tear line 65 to end 66 of sheet 61. Finally, a third band of adhesive 69 is provided in the medial portion of sheet 61. Preferably, band of adhesive 69 has the major portion thereof on one side of fold line 62 and only a minor portion thereof on the opposite side of fold line 62. It is also preferred that the adhesive bands 67, 68 and 69 be of a pressure sensitive adhesive to adhere to the surfaces brought into contact therewith upon such contact.

When label 60 is to be applied to folded bag 31, the label 60 is removed from a release paper (not shown) and then folded along the fold line 62 to form a "U" shape. The partially folded label 60 is placed in straddling relation to the juxtaposed free end portions of the folded bag 31 with a substantial amount of the label 60 projecting beyond the free ends thereof. The adhesive bands 67 and 68 are pressed into contact with the outer surfaces of the free end portions of the folded bag 31 so that the pressure sensitive adhesive will adhere thereto. The medial portions on opposite sides of the fold line 62 are pressed together so that the adhesive band 69 secures the medial portions of the label 60 together to retain the label 60 in its folded form and to provide a readily graspable handle for the foam-in-bag packaging system 30.

When it is desired to use a packaging system 30, the same can be removed from its carton or from a warming device by grasping the label 60 and pulling the packaging system 30 therefrom. Then, the folded bag 31 is grasped in one hand and the label 60 in the other hand and the portion of the label 60 between tear lines 63 and 65 is removed by tearing the end portions of the label having the bands of adhesive 67 and 68 thereon from the remainder of the label 60 along the tear lines 63 and 65. The removed portion of the label 60 may then be discarded and the bag 31 unfolded and manipulated in the manner described above to break the frangible seal 49a, mix the first and second foam precursor components 52 and 53 and initiate the production of foam.

Figure 23:
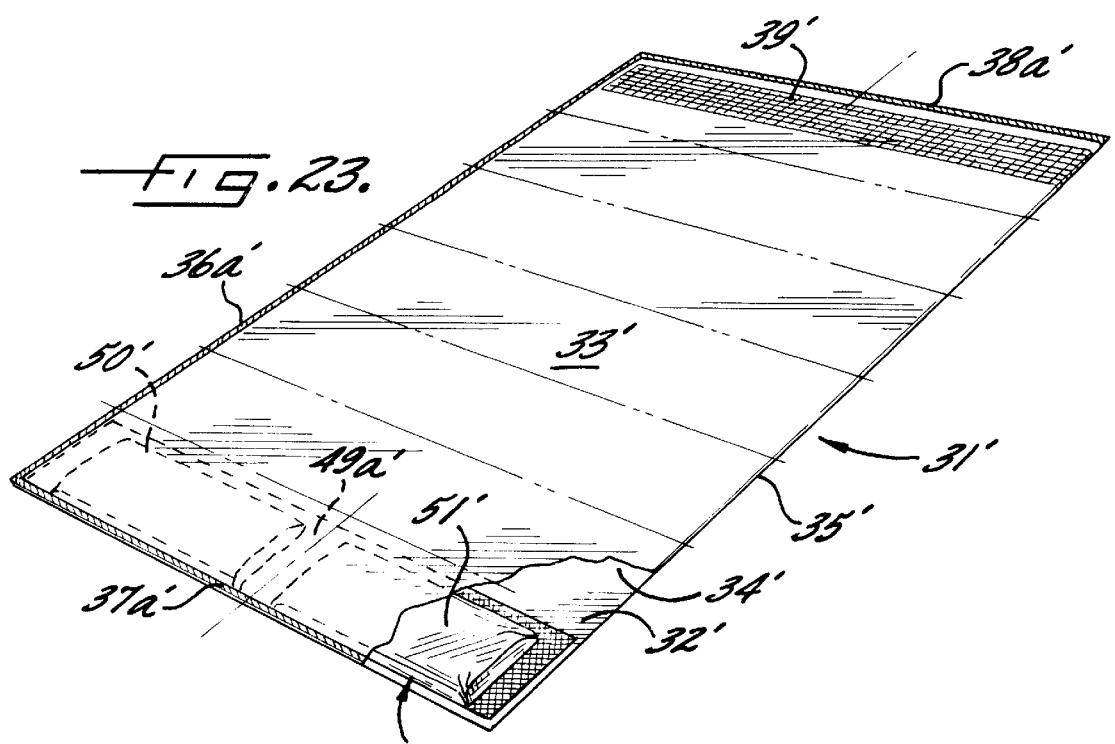
FIG. 23 is a perspective view of another embodiment of a foam-in-bag packaging system in accordance with the present invention.
Figure 24:
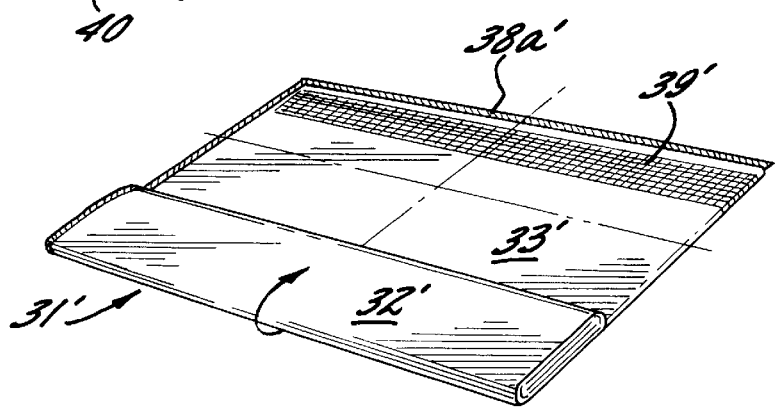
FIG. 24 is a view similar to FIG. 23 illustrating a manner of folding of the bag shown in FIG. 23.
Figure 25:
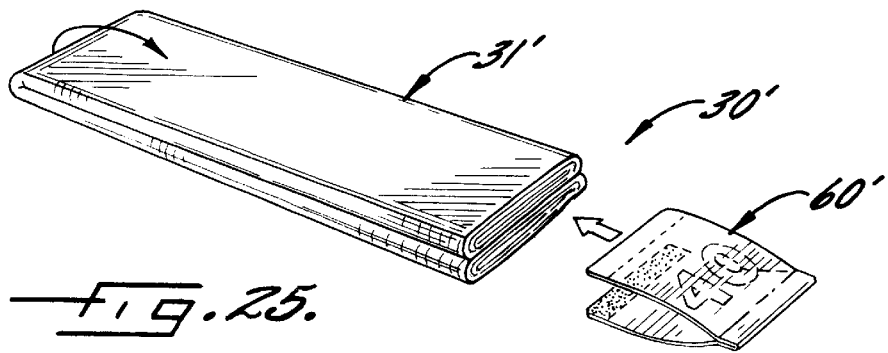
FIG. 25 is a perspective view similar to FIG. 24 illustrating a still further folding of the bag shown in FIG. 23.

Referring now to FIGS. 23 through 25, there is illustrated therein another embodiment of the packaging system of the present invention in which like characters are used to indicate like parts with the prime notation added. This embodiment of the present invention comprises a bag 31' composed of two panels 32' and 33' having their peripheral edges joined to form an enclosed space 34' therein. A band 39' of venting perforations is provided across panels 32' and 33'. A packet 40' is positioned within the enclosed space within bag 31' and is secured in place. In this embodiment, the packet 40' has a length corresponding to the width of bag 31' and the packet 40' is secured in the bag 31' by an adhesive (not shown).

Packet 40' likewise includes a frangible seal 49a' which separates and divides a first foam precursor compartment 50' and a second foam precursor compartment 51'. These compartments 50' and 51' contain respectively a first foam precursor component (not shown) and a second foam precursor component (not shown).

To form the compact packaging system 30', the bag 31' is folded along transversely extending fold lines, which preferably are spaced apart a distance substantially corresponding to the width of packet 40', as is illustrated in FIG. 24. Once the bag 31' is fully folded about such transverse fold lines, the same is folded further about a fold line substantially coincident with the frangible seal 49a' to bring opposed halves of the initially folded bag 31' into juxtaposition and with opposed free ends thereof substantially aligned. Finally, a label 60' is attached to the juxtaposed free end portions of the folded bag 31' to maintain the bag in folded form and to complete the compact packaging system 30'.

Referring now to FIG. 19, there is illustrated a still further embodiment of the packet of the present invention in which like reference characters are used to designate like elements with the double prime notation added. In this embodiment, a packet 40" is provided from panels 41" and 42" of barrier material, with the ends and edges thereof joined. The end edges are joined by heat seals 47" and 48" and the side edge is joined by a heat seal 46". Areas of printing 43" and 44" are provided in those areas in which frangible seals 49a" and 46a" are desired.

In this embodiment, a further area of printing 70 is provided extending transversely across panel 42" approximately midway between the frangible seal 49a" and the heat seal 48". A second transverse frangible seal 71 is provided across panels 41" and 42" along the printed area 70 to divide and separate the packet 40" into a first foam precursor compartment 50", a second foam precursor compartment 51" and a third foam precursor compartment 72. First compartment 50" is filled with a first foam precursor component (not shown) while the second foam precursor compartment 51" and the third foam precursor compartment 72 are filled with a second foam precursor component 53" or components. Preferably, the second compartment 51" is filled with a virgin second foam precursor component 53", while the third compartment 72 is filled with a recycled second foam precursor component 73.

This embodiment of the present invention permits a substantial portion of the second foam precursor component to be recycled and, therefore, environmental concerns are addressed thereby.

Referring now to FIGS. 20–22, there is illustrated therein a method of forming the packaging system 30 of the present invention. FIGS. 20–21 illustrate a preferred embodiment of forming the packets 40. In this method, a web 80 of barrier material is fed from a supply roll 81 to a forming and filling mandrel 82 over a forming collar 83. The web 80 is formed into a tube around the forming and filling mandrel 82 with the side edges thereof being brought into juxtaposed relation. A side sealing mechanism 84 is provided and includes opposed heat sealing jaws 85 and 86 which are successively moved toward and away from each other to heat seal together the juxtaposed side edges of the web 80 to form the side heat seal 46 of the packet 40. The web 80 has been previously printed with the printed areas 43 and 44 (not shown in these Figures) in the first embodiment or with printed areas 43" and 44" and 70 in the second embodiment.

Opposing conveyor feeding means 90 and 91 are disposed on opposite sides of the lower end portion of the mandrel 82 below the side sealing mechanism 84. The conveyor feeding means 90 and 91 operate intermittently to feed the formed tube downwardly in timed relation to the operation of the side sealing mechanism 84 and other operations.

Sealing means 92 is disposed downwardly beyond the lower end of the forming and filling mandrel 82 and the conveyor feeding means 90 and 91 and has opposed heat sealing jaws 93 and 94. Jaws 93 and 94 are movable toward and away from each other to permit the tube formed from web 80 to pass downwardly therebetween when apart and to form the transverse seal 49 and the heat seals 47 and 48 of packet 40 when moved together. A cutoff mechanism 95 is disposed within the sealing jaw 93 and is movable outwardly from the sealing jaw 93 to sever the leading packet 40 from the tube formed of web 80 when the formation of a packet 40 has been completed.

As illustrated in FIG. 21, the mandrel 82 has a first supply tube or passageway 96 therein which is connected at its upper end to a supply 100 for the first foam precursor component 52 through a valve 101. A second supply tube or passageway 97 in mandrel 82 is connected at its upper end to a supply 102 for the second foam precursor component 53 through a valve 103. Finally, a vent tube or passageway 99 is included in mandrel 82 and is connected at its upper end to the atmosphere.

In accordance with this method, the web 80 of barrier material, which has been previously printed with the printed areas 43 and 44 or 43", 44" and 70, is withdrawn from the supply roll 81 and formed into a tube about mandrel 82. The tube is fed downwardly where the side seal 46 or 46", is formed by the side sealing mechanism 84. When the lower end of the tube passes beyond the lower end of the mandrel 82 and the conveyor feeding means 90 and 91 and reaches the sealing means 92, the leading end of the tube is closed by the formation of a seal 47 thereacross. The control means (not shown) activates the valve 103 to feed a predetermined amount of the second foam precursor component 53 into the closed lower end of the tube formed from the web 80. Once the predetermined amount of the second foam precursor component 53 has been fed downwardly through supply tube 97 into the tube of barrier material, the valve 103 is closed and the tube is fed downwardly a distance corresponding to the length of the second compartment 51. The feeding means 90 and 91 are stopped and the sealing means 92 is activated to form the transverse seal 49 including the first frangible seal 49a.

Once this seal 49 is formed, the valve 101 is opened and a predetermined amount of the first foam precursor component 52 is fed into the tube formed of the web 80 above the seal 49. Once the first compartment is filled, the tube of barrier material 80 is fed downwardly until the predetermined length of a packet 40 is in position between the jaws 93 and 94 of the transverse sealing mechanism 92. The jaws 93 and 94 are then caused to move together to form heat seal 48 transversely of the tube and the cutoff mechanism 95 is activated to cut the completed packet 40 from the remainder of the tube. The completed packet 40 drops downwardly into a receptacle (not shown) for inclusion in a bag 31 to form the packaging system 30 of the present invention.

Referring now to FIG. 22, there is illustrated a method for forming the bags 31 and 31'. In this method, a conveyor belt 110 is provided for feeding packets 40 into position for inclusion in the bags 31 being formed. A web of plastic material P is fed from a roll (not shown) to a folding mechanism 111 which folds the web along a longitudinally extending fold line substantially corresponding to the centerline of the web P. The folding mechanism 111 is positioned relative to the conveyor 110 such that the web P is folded with one portion of the web disposed below the conveyor 110 and the other portion of the web disposed above the conveyor 110. The upper and lower portions of the folded web are then fed in the same direction as movement of the conveyor 110 to a sealing mechanism 112.

The sealing mechanism 112 is generally L-shaped with a first portion 113 extending longitudinally of the web P and a second portion 114 extending transversely thereof. The portion 114 of the L-shaped mechanism 112 includes a cutoff mechanism 115 for severing the web into discrete lengths once the transverse mechanism 114 has formed a bar seal across the web. In this manner, bags 31 are formed with the side edges opposing the folded side edge being heat sealed together and the ends thereof being sealed transversely of the web to form the enclosed space 34 therein.

The operation of the conveyor 111 is timed to the feeding of the plastic web such that the packets 40 are fed into position adjacent one end of the bags 31 being formed by the bag forming mechanism. A pair of hot melt adhesive nozzles 116 and 117 are provided above conveyor 110 and are either timed to operate as a packet 40 passes thereunder to form the bands or beads 54, 55 of adhesive or have a sensing means (not shown) that senses the arrival of a packet 40 thereunder to operate the nozzles 116 and 117 to apply such hot melt adhesive to the packet 40. Once the conveyor 110 delivers the packet 40 past the folding means 111, the hot melt adhesive 54 and 55 contacts the plastic film material and immediately adheres the packet 40 thereto.

Since gaseous by-products are generated during the reaction that forms the foam cushion, the enclosed space 34 of the bag 31 must be vented to the outside of the bag to permit such gaseous by-products to escape. Accordingly, the sealing mechanism 112 includes a vent forming member 120 which moves upwardly and downwardly with the sealing mechanism 112 and includes a multiplicity of sharp pointed spikes or punches which form the band 39 of vent openings through the plastic material of the panels 32 and 33. The completed bag 31 when severed from the web P is delivered by a delivery mechanism (not shown) to the bag folding area.

In the drawings and specifications, there has been set forth a preferred embodiment of the invention, and although specific terms are employed, they are used in a generic and descriptive sense only and not for purposes of limitation, the scope of the invention being set forth in the following claims.

That which is claimed:

1. A packaging system for producing a foam-in-bag cushion upon demand comprising a bag formed of flexible plastic film material and defining therein an enclosed space of a volume corresponding to the size of the foam cushion to be produced, said enclosed space being vented to the outside of said bag to permit the escape of gases generated during the formation of the foam cushion while preventing the escape of foam therefrom, a foam precursor packet positioned at a predetermined location within said enclosed space in said bag and including a plurality of compartments therein, said packet including a first compartment and a second compartment with a first frangible seal separating said first and second compartments and adapted to be broken when it is desired to form the foam cushion, said packet also including a second frangible seal between said second compartment and said enclosed space in said bag, said packet being formed of barrier material capable of maintaining foam precursor components in a relatively stable and unreacted state, a first foam precursor component contained in said first compartment of said packet, a second foam precursor component contained in said second compartment of said packet, said first and second foam precursor components being adapted to be mixed upon breaking of said first frangible seal and to react to form foam which will break said second frangible seal and expand from said packet into said enclosed space in said bag until said enclosed space is substantially filled with foam and said foam cushion is formed, and said bag being folded along fold lines parallel to a lengthwise dimension of said packet into folds having a predetermined width and the folded bag being folded along a fold line substantially corresponding to said first frangible seal of said precursor packet to position said first and second compartments of said packet and the corresponding folded portions of said bag into juxtaposition with free ends of the folded bag adjacent each other to provide a compact packaging system in which said first and second foam precursor components are not only maintained separated by said first frangible seal but are also maintained separated mechanically by the fold in said packet and said bag along said first frangible seal.

2. A packaging system according to claim 1 including removable means for securing the free ends of the folded bag together to maintain said bag in its folded condition.

3. A packaging system according to claim 1 wherein said bag is generally rectangular and has a width and length corresponding to the width and length of the foam cushion to be formed, and wherein said precursor packet has a length substantially corresponding to the width of said bag and a width of a fraction of the length of said bag.

4. A packaging system according to claim 2 wherein said packet is located at one end of said bag and is secured to said bag.

5. A packaging system according to claim 1 wherein said second compartment in said precursor packet is divided into first and second sub-compartments by a third frangible seal, and wherein said second foam precursor component comprises a virgin second precursor component in said first sub-compartment and a recycled second precursor component in said second sub-compartment of said packet, said virgin and recycled second precursor components being adapted to be mixed together upon breaking of said third frangible seal and thereafter to be mixed with said first precursor component upon breaking of said first frangible seal.

6. A packaging system according to claim 1 wherein said bag is generally rectangular and has a predetermined length and width, and wherein said packet is positioned at one end of said bag and has a length less than the width of said bag.

7. A packaging system according to claim 6 wherein said packet has said first frangible seal positioned substantially on the longitudinal centerline of said bag.

8. A packaging system according to claim 7 wherein said bag is folded along longitudinal fold lines adjacent opposite ends of said packet prior to being folded along transverse fold lines.

9. A packaging system according to claim 6 including means securing said packet to said bag in said enclosed space.

10. A packaging system according to claim 9 wherein said securing means comprises an adhesive.

11. A packaging system according to claim 10 wherein said adhesive comprises spaced apart lines of hot melt adhesive extending transversely of said packet.

12. A packaging system according to claim 2 wherein said removable means comprises a fracturable label adhesively secured to said free ends of said folded bag.

13. A packaging system according to claim 12 wherein said label comprises an elongate member having a fold line medially of said member, a pair of tear lines in spaced relation to opposite ends of said elongate member, and bands of adhesive positioned between said tear lines and the ends of said label for securing the label to said free ends of said folded bag.

14. A packaging system according to claim 13 including a band of adhesive adjacent said medial fold line for securing the medial portions of said label together when said label is folded and applied to said folded bag.

15. A packaging system according to claim 14 wherein said bands of adhesive are pressure sensitive adhesive.

16. A packaging system according to claim 14 wherein said medial portion of said label extends outwardly from said free ends of said folded bag so that said medial portion may be readily grasped for removal thereof by fracturing the label along said tear lines.

17. A packaging system according to claim 1 wherein said bag has indicia thereon at predetermined locations on opposite sides of said first frangible seal of said packet, said predetermined locations overlying said first and second compartments and indicating to a user where pressure should be applied firstly to break said first frangible seal to permit said first and second foam precursor components to be mixed and secondly to cause said components to mix.

18. A packaging system for producing a foam-in-bag cushion upon demand comprising
 a bag formed of flexible plastic film material and defining therein an enclosed space of a volume corresponding to the size of the foam cushion to be produced, said enclosed space being vented to the outside of said bag to permit the escape of gases generated during the formation of the foam cushion while preventing the escape of foam therefrom,
 a foam precursor packet positioned at a predetermined location within said enclosed space in said bag and being formed of a barrier material capable of maintaining foam precursor components in a relatively stable and unreacted state, said packet including a first compartment and a second compartment with a first frangible seal separating said first and second compartments and adapted to be broken when it is desired to form the foam cushion, said packet also including a second frangible seal between said second compartment and said enclosed space in said bag,
 a first foam precursor component contained in said first compartment of said packet,
 a second foam precursor component contained in said second compartment of said packet,
 said first and second foam precursor components being adapted to be mixed upon breaking of said first frangible seal and to react to form foam which will break said second frangible seal and expand from said packet into said enclosed space in said bag until said enclosed space is substantially filled with foam and said foam cushion is formed,
 said packet having a predetermined length and width such that said first and second compartments are only of a size required for the amounts of said first and second foam precursor compositions for the production of the size of foam cushion desired, and
 means for securing said packet in said bag at said predetermined location.

19. A packaging system according to claim 18 wherein said bag is rectangular with a predetermined length and a predetermined width, and wherein said packet is elongate and has a length less than the width of said bag.

20. A packaging system according to claim 19 wherein said first frangible seal of said packet is located substantially at the longitudinal center-line of said bag.

21. A packaging system according to claim 18 wherein said securing means comprises an adhesive.

22. A packaging system according to claim 21 wherein said adhesive comprises spaced apart lines of adhesive extending transversely of said packet.

23. A packaging system according to claim 22 wherein said adhesive is a hot melt adhesive.

24. A packaging system according to claim 18 wherein said packet has a third frangible seal extending transversely of said second compartment parallel to said first frangible seal and dividing said second compartment into a pair of compartments.

25. A packaging system according to claim 24 wherein said second foam precursor component in one of said pair of second compartments is a virgin second foam precursor component and said second foam precursor component in the other of said pair of second compartments is a recycled second foam precursor component.

26. A packaging system according to claim 18 wherein said frangible seals are each formed by a band of printing extending transversely along one of contiguous surfaces of said packet, said band of printing comprising a pattern of spaced apart printed areas separated by intersecting lines of unprinted surface areas defining a grid pattern with said lines intersecting at substantially right angles, and a heat seal extending along said band of printing and joining said contiguous surfaces together only along said lines of unprinted surface areas, said grid pattern being arranged relative to said heat seal such that a longitudinal center-line of said heat seal does not cross all of the intersections of said lines of unprinted surface areas to provide a frangible seal which breaks relatively evenly and smoothly.

27. A packaging system according to claim 26 wherein said grid pattern of lines of unprinted surface areas is disposed at an acute angle to said heat seal.

28. A packaging system according to claim 27 wherein said acute angle is within the range of about 5° to 9°.

29. A packaging system according to claim 28 wherein said acute angle is about 7°.

30. A packaging system for producing a foam-in-bag cushion upon demand comprising,
 a bag formed of flexible plastic film material and defining therein an enclosed space vented to the outside of said bag to permit the escape of gases generated during formation of foam while preventing the escape of foam therefrom;

a packet formed of a barrier material capable of maintaining foam precursor components in a relatively stable and unreacted state and being positioned in said enclosed space in said bag, said packet defining therein an enclosed space and having first and second frangible seals dividing said enclosed space into first, second and third compartments, said packet also including a third frangible seal between said second compartment and said enclosed space in said bag for escape of foam into said enclosed space of said bag upon formation of such foam, a first foam precursor component contained in said first compartment in said packet, a virgin second foam precursor component contained in said second compartment in said packet, a recycled second foam precursor component contained in said third compartment in said packet, said first and second foam precursor components being adapted to be mixed upon breaking of said first and second frangible seals and to react when mixed to form foam which will break said third frangible seal and escape from said packet into said bag until said enclosed space in said bag is substantially filled with foam, and said frangible seals each being formed by a band of printing extending transversely along one of contiguous surfaces of said packet, said band of printing comprising a pattern of spaced apart printed areas separated by intersecting lines of unprinted surface areas defining a grid pattern with said lines intersecting at substantially right angles, a heat seal extending along said band of printing and joining said contiguous surfaces together along said lines of unprinted surface areas, said grid pattern being arranged relative to said heat seal such that a longitudinal center-line of said heat seal does not cross all of the intersections of said lines of unprinted surface areas.

31. A packaging system according to claim 30 wherein said grid pattern of lines of unprinted surface areas is disposed at an acute angle to said heat seal.

32. A packaging system according to claim 31 wherein said acute angle is within the range of about 5° to 9°.

33. A packaging system according to claim 32 wherein said acute angle is about 7°.

34. A method of producing a foam-in-a-bag packaging system comprising:

feeding a pair of panels of flexible plastic film material into superposed relation along a predetermined path of travel;

feeding elongate, packets each having first and second compartments separated by a frangible seal and containing first and second foam precursor components, between said superposed panels at spaced apart locations with said packets disposed transversely of said panels;

securing said packets to said plastic film material to prevent said packets from moving relative thereto;

forming successive elongate bags from said superposed panels having side edges and opposite end edges joined, and with said packet being located adjacent one end of said bag, forming vent openings in said bag to the exterior thereof in spaced relation to said packet to provide for the escape of gases during foam formation; and separating said successive bags from each other by transversely severing the plastic film material.

35. A method according to claim 34 wherein said pair of superposed panels are formed by folding a web of plastic film substantially along its longitudinal center-line to bring opposing longitudinal portions of the web into superposition with the fold forming one of the joined side edges of the panels.

36. A method according to claim 35 wherein the other side edge of the panels and opposite ends of said bags are joined by heat sealing.

37. A method according to claim 36 wherein said vent openings are formed by puncturing at least one of said panels to form holes therein.

38. A method according to claim 37 including folding each of said bags along a plurality of transverse fold lines to produce an elongate folded bag having a length corresponding to the width of said panels and with free ends at opposite side edges of said panels, and folding each of said folded bags along a transverse fold line substantially coincident with said frangible seal in said packet to bring said free ends into juxtaposition.

39. A method according to claim 38 including releasably securing said free ends of each of said bags together to complete a compact package of each of said bags for ease of handling, shipment to users and storage.

40. A method according to claim 39 wherein said pair of panels are wider than the length of said packet and including folding said panels along longitudinal fold lines substantially coincident with opposite ends of said packet prior to folding said bag along the transverse fold lines.

41. A method according to claim 39 wherein said packet has a length substantially equal to the width of said panels and a width only a fraction of the length of said panels.

42. A method according to claim 41 wherein said bag is folded along transverse fold lines which are spaced apart a distance substantially the same as the width of said packet.

43. A method according to claim 39 wherein said packet has a width only a fraction of the length of said bag and said bag is folded along transverse fold lines spaced apart a distance substantially equal to the width of said packet.

44. A method according to claim 43 wherein said packet is positioned between said pair of panels with said frangible seal substantially coincident with the longitudinal center-line of said panels.

45. A method of forming a foam-in-bag packaging system comprising forming an elongate packet of flexible barrier material of a predetermined length and width and having a plurality of compartments therein separated by at least one interior frangible seal and having an exterior frangible seal, and dispensing into said compartments first and second foam precursor components which when mixed will form foam;

forming an elongate bag having a substantially enclosed interior space substantially the size of a packaging cushion to be formed and including said packet in said interior space adjacent one end of said bag, the predetermined width of said packet being substantially less than the length of said bag;

folding said bag along transverse fold lines parallel to said packet to form a folded bag in which the dimension lengthwise of said packet is substantially greater than the dimension width wise of said packet, and folding said folded bag along a fold line substantially corresponding to said interior frangible seal of said packet so that the folded barrier material forms a mechanical barrier to said foam precursor components.

46. A method according to claim 45 including securing free ends of said folded bags together by a removable label.

47. A method of producing a compact packaging system including an elongate bag of plastic film material defining an enclosed space vented to the outside of the bag and adapted to receive foam and a foam precursor packet formed of a barrier material and having at least two compartments separated by a frangible seal and containing first and second foam precursor components, said packet being located at one end of said enclosed space in said bag, said method including folding said bag along a plurality of transverse fold lines to produce an elongate folded bag having a dimension lengthwise of said unfolded bag substantially less than a width wise dimension of said unfolded bag and also having opposing free ends, and folding said folded bag along said frangible seal of said packet to bring said free ends into juxtaposition and to create a mechanical barrier to mixing of the first and second precursor components.

48. A method according to claim 47 including releasably securing said free ends of said folded bag together.

49. A method according to claim 47 wherein said packet is elongate and has a length substantially equal to the width of said bag and a width of only a fraction of the length of said bag and said bag is folded along said transverse fold lines which are spaced apart a distance substantially the same as the width of said packet.

50. A method according to claim 47 wherein said packet is elongate and has a length less than the width of said bag and a width of only a fraction of the length of said bag.

51. A method according to claim 50 including folding said bag along longitudinal fold lines substantially coincident with opposite ends of said packet prior to folding thereof along said transverse fold lines.

52. A method according to claim 48 wherein said transverse fold lines are spaced apart a distance substantially the same as the width of said packet.

* * * * *